US012615549B2

(12) United States Patent
Previti et al.

(10) Patent No.: US 12,615,549 B2
(45) Date of Patent: Apr. 28, 2026

(54) TRAFFIC LOAD MANAGEMENT

(71) Applicant: Telefonaktiebolaget LM Ericsson (publ), Stockholm (SE)

(72) Inventors: Alessandro Previti, Stockholm (SE); Alexandros Nikou, Stockholm (SE); Aneta Vulgarakis Feljan, Stockholm (SE); Athanasios Karapantelakis, Solna (SE)

(73) Assignee: Telefonaktiebolaget LM Ericsson (pub!), Stockholm (SE)

( * ) Notice: Subject to any disclaimer, the term of this patent is extended or adjusted under 35 U.S.C. 154(b) by 489 days.

(21) Appl. No.: 18/014,997

(22) PCT Filed: Jul. 7, 2020

(86) PCT No.: PCT/IB2020/056389
§ 371 (c)(1),
(2) Date: Jan. 6, 2023

(87) PCT Pub. No.: WO2022/008954
PCT Pub. Date: Jan. 13, 2022

(65) Prior Publication Data
US 2023/0262521 A1     Aug. 17, 2023

(51) Int. Cl.
*H04W 28/08*     (2023.01)
*H04W 24/02*     (2009.01)
*H04W 28/086*     (2023.01)

(52) U.S. Cl.
CPC ....... *H04W 28/0942* (2020.05); *H04W 24/02* (2013.01); *H04W 28/0835* (2020.05); *H04W 28/0864* (2023.05); *H04W 28/0983* (2020.05)

(58) Field of Classification Search
CPC ......... H04W 28/0864; H04W 28/0942; H04W 24/02; H04W 28/0835; H04W 28/0983;
(Continued)

(56) References Cited

U.S. PATENT DOCUMENTS

2005/0197875 A1* 9/2005 Kauffman ........ G06Q 10/06316
705/7.26
2016/0165468 A1* 6/2016 Gopalakrishnan .... H04W 24/08
370/252
(Continued)

FOREIGN PATENT DOCUMENTS

WO     WO-2019170391 A1 * 9/2012 .......... H04W 28/086

OTHER PUBLICATIONS

International Search Report and Written Opinion with Transmittal dated Mar. 17, 2021 in International Application No. PCT/IB2020/056389 (18 pages).
(Continued)

*Primary Examiner* — Mehmood B. Khan
(74) *Attorney, Agent, or Firm* — Sonoda & Kobayashi Intellectuall Property Law; Darren M. Gardner

(57) ABSTRACT

A reinforcement learning (RL) process is used to allocate UL/DL resources and is also used to offload traffic from a first access point (e.g., macro access point) to a second access point (e.g., a micro access point) when the load on the first access point is too high. The RL process is able to handle the dynamic nature of UL/DL imbalances and is therefore able to maximize usage of resources without compromising quality of service.

16 Claims, 4 Drawing Sheets

(58) Field of Classification Search
CPC .. H04W 24/08; H04W 28/0862; G06N 3/006;
G06N 20/00
See application file for complete search history.

(56) References Cited

U.S. PATENT DOCUMENTS

| | | | |
|---|---|---|---|
| 2016/0165469 A1* | 6/2016 | Gopalakrishnan .... | H04W 16/28 |
| | | | 455/67.11 |
| 2016/0165472 A1* | 6/2016 | Gopalakrishnan .... | H04W 24/10 |
| | | | 455/67.11 |
| 2020/0113017 A1* | 4/2020 | Logothetis ............ | H04W 48/20 |
| 2021/0241090 A1* | 8/2021 | Chen ...................... | G06N 3/092 |
| 2021/0289406 A1* | 9/2021 | Feki .................... | H04L 41/0823 |
| 2022/0124543 A1* | 4/2022 | Orhan ................. | H04W 28/021 |

OTHER PUBLICATIONS

Sutton, R., et. al., "Reinforcement Learning: An Introduction," MIT Press, 2018 (548 pages).
Saad, W., et. al., "A Utility-based Algorithm for joint uplink/downlink scheduling in wireless cellular networks," Journal of Network and Computer Applications 35(1):348-356 (2012) (9 pages).

* cited by examiner

300

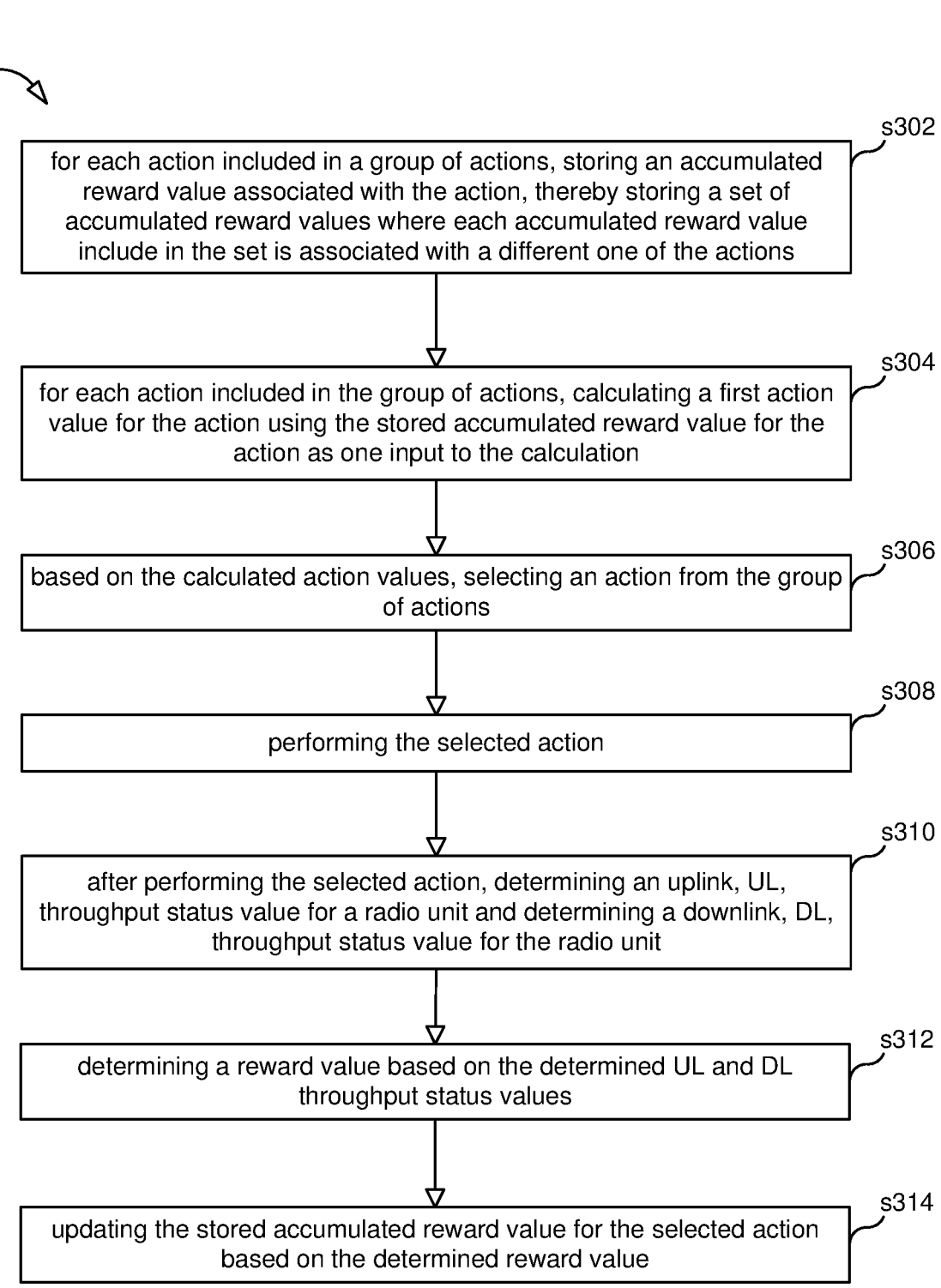

s302
for each action included in a group of actions, storing an accumulated reward value associated with the action, thereby storing a set of accumulated reward values where each accumulated reward value include in the set is associated with a different one of the actions s304
for each action included in the group of actions, calculating a first action value for the action using the stored accumulated reward value for the action as one input to the calculation s306
based on the calculated action values, selecting an action from the group of actions s308
performing the selected action s310
after performing the selected action, determining an uplink, UL, throughput status value for a radio unit and determining a downlink, DL, throughput status value for the radio unit s312
determining a reward value based on the determined UL and DL throughput status values s314
updating the stored accumulated reward value for the selected action based on the determined reward value

FIG. 3

TRAFFIC LOAD MANAGEMENT

CROSS REFERENCE TO RELATED APPLICATIONS

This application is a 35 U.S.C. § 371 National Stage of International Patent Application No. PCT/IB2020/056389, filed Jul. 7, 2020.

TECHNICAL FIELD

Disclosed are embodiments related to traffic load management in a mobile communication network.

BACKGROUND

In general, there are two basic spectrum usage techniques for mobile communication networks, namely Frequency Division Duplex (FDD) and Time Division Duplex (TDD). FDD uses two separate frequency bands, one for transmitting and one for receiving data, separated by a "guard band," while TDD uses the same frequency band for transmitting and receiving, but transmission and reception take place in different time slots. Traditionally, equal bandwidth is assigned to the uplink (UL) and downlink (DL) traffic, given that the dominant service was phone calls-which has a symmetrical traffic load profile (i.e., the UL load is the generally the same as the DL load).

SUMMARY

Certain challenges presently exist. For instance, with the evolution of mobile broadband, and more recently ultra-reliable low latency communications (URLLC) and massive machine-type communications (mMTC), there is a much greater likelihood that the network will experience an imbalance between UL and DL traffic loads.

There are currently several techniques that allow for non-uniform allocation of UL/DL bandwidth, depending on the technology (see, e.g., reference [2]). However, the research state of art that links a characterization of the traffic in a cell site with UL/DL ratio is still relatively unexplored. The problem is highly relevant in 5G networks, as multiple services will run on top of the mobile network and the asymmetricity of UL/DL will vary temporally and between different geographical locations. Therefore, dynamic UL/DL bandwidth allocation optimization is quite relevant. The current approach is to configure this ratio manually or based on data traffic patterns that have been predicted before.

This disclosure addresses the problem of UL/DL allocation of resources (e.g., frequencies or timeslots) performed by, for example, a baseband unit of an access point, using a reinforcement learning (RL) approach. In one aspect, a RL process is used to allocate UL/DL resources and is also used to offload traffic from a first access point (e.g., macro access point) to a second access point (e.g., a micro access point) when the load on the first access point is too high. The RL process is able to handle the dynamic nature of UL/DL imbalances and is therefore able to maximize usage of resources without compromising quality of service.

Accordingly, in one aspect there is provided a reinforcement learning (RL) method for traffic load management. The method is performed by an RL agent of a first access point. The method includes, for each action included in a group of actions, storing an accumulated reward value associated with the action, thereby storing a set of accumulated reward values where each accumulated reward value included in the set is associated with a different one of the actions. The method also includes for each action included in the group of actions, calculating a first action value for the action using the stored accumulated reward value for the action as one input to the calculation. The method also includes selecting, based on the calculated action values, an action from the group of actions. The method also includes performing the selected action. The method also includes, after performing the selected action, determining an UL throughput status value for a radio unit of the first access point and determining a DL throughput status value for the radio unit, wherein the radio unit has an UL throughput capacity (i.e., a set maximum UL throughput) and a DL throughput capacity (i.e., a set maximum DL throughput). The method further includes determining a reward value based on the determined UL and DL throughput status values. The method also includes updating the stored accumulated reward value for the selected action based on the determined reward value.

The RL agent disclosed herein provides the advantage of automatically optimizing UL/DL bandwidth allocation.

BRIEF DESCRIPTION OF THE DRAWINGS

The accompanying drawings, which are incorporated herein and form part of the specification, illustrate various embodiments.

FIG. 3 is a flowchart illustrating a process according to some embodiments.

DETAILED DESCRIPTION

Figure 1:
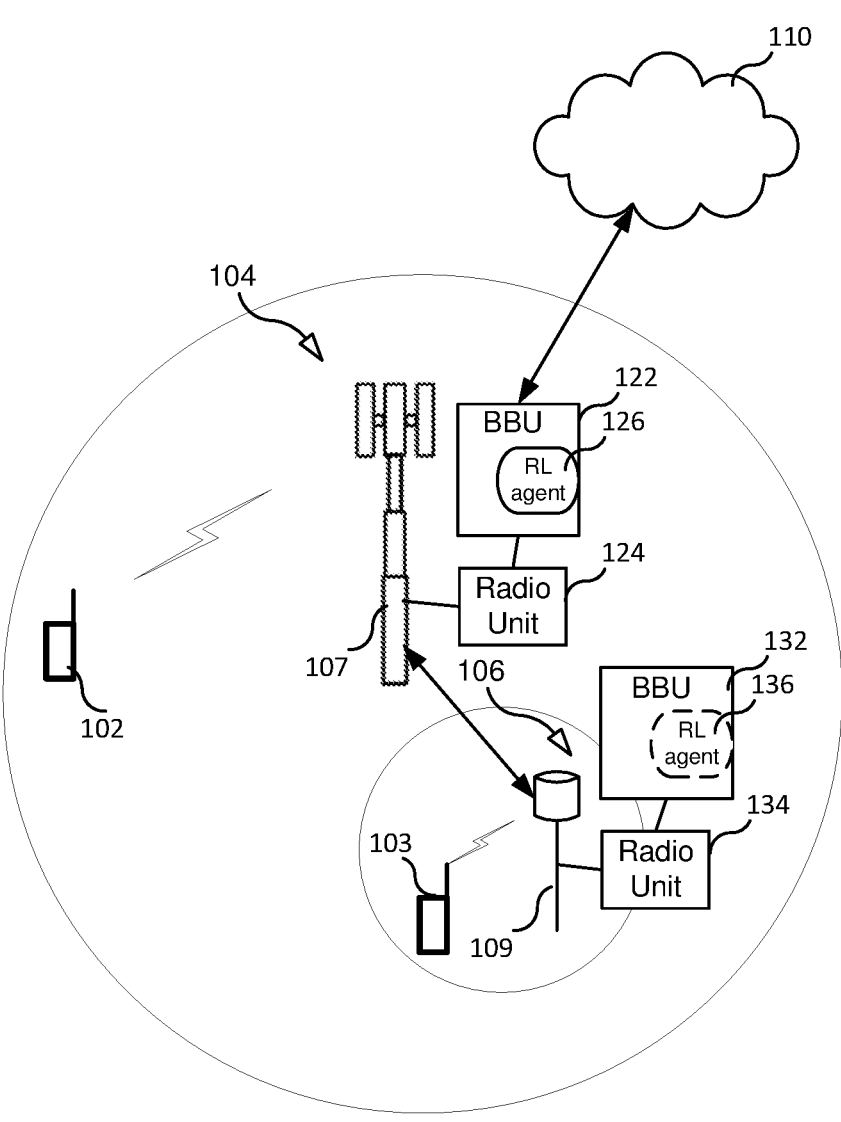
FIG. 1 illustrates a communications network according to an embodiment.

FIG. 1 illustrates a communications network 100 according to an embodiment. In the example embodiment shown, communications network 100 includes a first access point 104 (which in this example is a macro access point) serving a first user equipment (UE) 102 and a second access point 106 (which in this example is a micro access point or "small cell" access point) serving a second UE 103. While only two access points and two UEs are shown, this was done solely for the sake of brevity because communications network 100 can include virtually any number of access points and UEs. As further shown in FIG. 1, access point 104 includes a baseband unit (BBU) 122, a radio unit 124, and an antenna arrangement 107 (i.e., one or more antennas), and access point 106 includes a BBU 132, a radio unit 134, and an antenna arrangement 109.

As noted above, there is a possibility that the communications network 100 will experience an imbalance between UL and DL traffic loads. Accordingly, this disclosure introduces of a new method for automatic, dynamic, and optimal traffic load management for UL and DL bandwidth allocation. More specifically, at least one reinforcement learning (RL) agent 126 is employed to manage the UL/DL bandwidth allocation for access point 104. In some embodiments, access point 106 also employs an RL agent 136 to manage the UL/DL bandwidth allocation for access point 106.

In one embodiment, each RL agent 126, 136 performs the dynamic UL/DL allocation using an Upper Confidence Bound (UCB) algorithm, and, if required, RL agent 126 performs a handover of UE 102 to access point 106. More specifically, every T units of time (e.g., every T minutes), an RL agent selects an action from a predefined set of actions using the UCB algorithm and state information associated with each action (e.g., each action has its own accumulated reward value that indicates how effective the action has been at maintaining an optimal UL/DL bandwidth allocation).

In some embodiments, every cell has its own RL agent. In the example shown, each RL agent 126, 136 is integrated in the BBU of the respective access point 104, 106. If a BBU is responsible for more than one cell, then multiple RL agent instances can be executed in the BBU, one RL agent for each cell. In some embodiments, the UL/DL allocation involves the respective RL agent communicating with its respective radio unit to inform the radio unit as to the UL/DL allocation ratio selected by the RL agent, which ratio is then implemented by the radio unit.

The UCB algorithm is a means for selecting a certain action (denoted "a_i") from a set of pre-defined actions (denoted a_1, a_2, . . . , a_N) based on state information associated with each action and a global state vale (denoted t). In one embodiment, for each predefined action a_i, the RL agent keeps track of two state values: an accumulated reward value for the action (denoted AR(a_i)) and a value identifying the number of times the action has been selected since a given point in time (this is denoted N(a_i)). For example, RL agent 126 may maintain a state table of the following format:

|     | AR  | N   |
| --- | --- | --- |
| a_1 | 1   | 3   |
| a_2 | 3   | 5   |
| a_3 | 0   | 4   |
| ... | ... | ... |

Thus, in this example, AR(a_2)=3, and N(a_2)=5. Additionally, the RL agent maintains a global state value (t) that specifies the number of times an action has been selected since the given point in time.

In one embodiment, selecting an action using the UCB algorithm includes the following steps.

Step 1: for each action a_i, calculate a corresponding action value (denoted AV(a_i)) for the action a_i using AR(a_i), N(a_i), and t as inputs to the calculation. For example, in one embodiment:

$$AV(a\_i) = AR(a_i)/N(a_i) + c\sqrt{\frac{\ln T}{N(a_i)}}, \qquad \text{(Eq. 1)}$$

where $c$ is a predefined constant.

Step 2: based on the calculated action values, the RL agent selects one of the actions from the group of actions. For example, in one embodiment, the RL agent determines the highest action value and then selects the action corresponding to the highest action value. For instance, if AV(a_j)>AV(a_i) for i=1 to N and i≠j, then action a_j is the selected action. Mathematically, this can be expressed as:

$$A_t \doteq \underset{a}{\operatorname{argmax}}[AV(a_i)] \qquad \text{(Eq. 2)}$$

After an action is selected, the RL agent implements the action (e.g., increase or decrease UL or DL capacity), increments t (e.g., t=t+1), and increments the counter N for the selected action (i.e., if action a_i was the selected action, then N(a_i) is updated such that N(a_i)=N(a_i)+1. After the selected action is implemented, the system is observed for a time period equal to T, and at the end of T a reward value (R) is determined based on the observations. After R is determined, the accumulated reward value (AR) for the selected action is updated—e.g., if action a_i was the selected action, then AR(a_i) is updated as follows: AR(a_i)=AR(a_i)+R. After the state variables are updated, the RL agent can then again select an action based on the UCB algorithm and repeat the process. In this way, the RL agent automatically and dynamically optimizes the UL/DL bandwidth allocation.

Example

In one embodiment, the set of actions {a_1, a_2, . . . a_N} (i.e., the Action space A) consists of three actions: A={a_1, a_2, a_3}, where a_1 increases uplink allocation (decrease downlink allocation) by step p; a_2 decreases uplink allocation (increases downlink allocation) by step p; and a_3 keep the allocation constant (i.e., neither increase nor decrease the allocation). The actual value of the step p depends on the spectrum range (smaller values for smaller spectrum range that is owned from/leased by the operator), as well as the current cell load—for example more "extreme" changes to the allocation ratio will impact current data traffic—so for a large p changes could be done during off-times, e.g. during night, when no/few UEs are attached and active. Some indicative values of the step p could be 5 or 10 MHz.

Determining the Reward (R)

In one embodiment, R is normalized over the maximum throughput, i.e., r is in the range of 0-1, inclusive. In one embodiment, R is determined as shown in table 1:

TABLE 1

| Process for Determining R |
| --- |
| If (UL is Overloaded && DL is Overloaded) |
|   R = −1; |
| Else if (UL is Underused && DL is Underused) |
|   R = 1; |
| Else |
|   R = (1 − (UL_T + DL_T) / (MAX_UL_T + MAXDL_T) ), where |
|     UL_T is a determined UL throughput value, |
|     DL_T is a determined DL throughput value, |
|     MAX_UL_T is a value specifying the radio unit's UL |
|     throughput capacity, and |
|     MAX_DL_T is a value specifying the radio unit's DL |
|     throughput capacity. |

In one embodiment, the RL agent determines whether the UL is overused or underused by sampling the UL throughput Z times during the T period of time, and then, if at least X % of the number of samples is less than MAX_UL_T, then UL is declared to be underused, and if at least Y % of the number of samples is greater than or equal to MAX_UL_T, then the UL is declared to be overused. For example, the T period of time may be divided into Z sub-periods of length T/Z, and the UL throughput is determined for each sub-period. If at least X % of these Z UL throughput values is less than MAX_UL_T, then the UL is underused, but if at least Y % of the Z UL throughput values is less than MAX_UL_T, then the UL is overused.

Similarly, the RL agent determines whether the DL is overused or underused by sampling the DL throughput Z times during the T period of time, and then, if at least X % of the number of samples is less than MAX_DL_T, then DL is declared to be underused, and if at least Y% of the number of samples is greater than or equal to MAX_DL_T, then the DL is declared to be overused.

A time period of length T is assumed. At the beginning of each time period, the RL agent uses the UCB algorithm to select an action a_1, a_2, or a_3 and implement the selected action. At the end of each time period, a reward is determined in order to evaluate the value of the action taken. In one embodiment, there is a counter of uplink and downlink throughput, and what is of interest is the capacity ratio for uplink and downlink. Traffic patterns in every cell are different. The long term reward measures the quality of the allocation. The percentage of uplink and downlink used can be expressed as a normalized amount (e.g., using a scale of 0 to 1, if 90% of the uplink channel is used, then the value would be 0.9).

Figure 2:
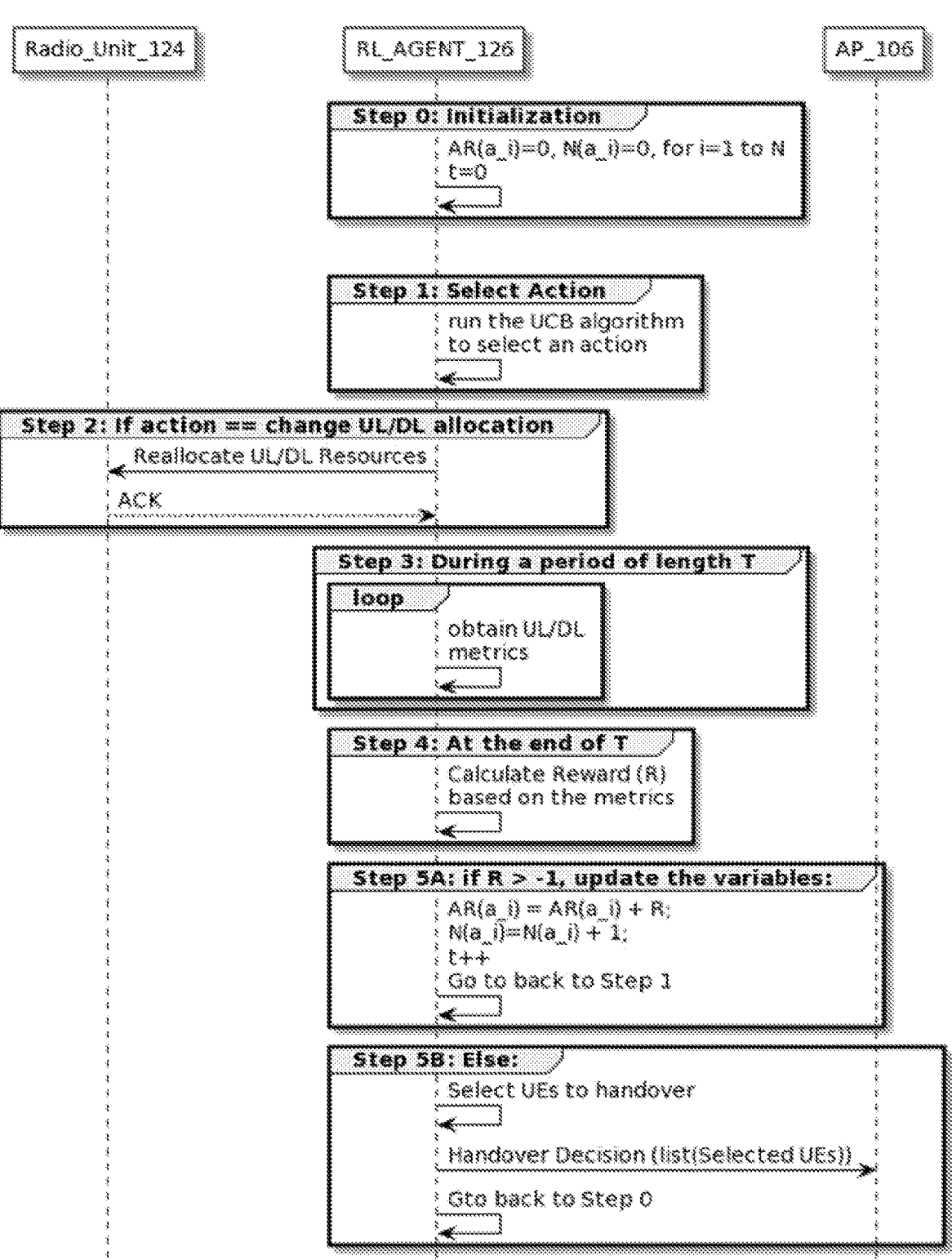
FIG. 2 is a sequence diagram according to an embodiment.

FIG. 2 is a sequence diagram illustrating a process according to the embodiment where A={a_1, a_2, a_3} as described above. The process begins with an initialization step (step 0). In this step, RL agent 126 initializes the state variables. For example, in step 0, for i=1 to 3, AR(a_i)=0 and N(a_i)=0. Additionally, t is set to 0.

Next (step 1), RL agent 126 runs the UCB algorithm to select an action from the action space A (see equations (1) and (2)).

Next (step 2) RL agent 126 implements the selected action. In this case, if the selection action is a_1 or a_2, then RL 126 sends to radio unit 124 a reallocation message indicating the amount by which radio unit 124 should modify the UL and DL capacity (e.g., the message includes the p value discussed above and an indication as to whether to increase or decrease the UL capacity). Radio unit 124 may respond by sending an acknowledgement (positive or negative).

Next (step 3), for a time period of length T, RL agent obtains UL and DL metrics. For instance, as described above, the T period of time may be divided into Z sub-periods of length T/Z, and the UL and DL throughputs are determined for each sub-period.

Next (step 4) the RL agent 126 uses the obtained metrics to determine the reward value (R) for the selected action. For example, RL agent 126 uses the process shown in Table 1 to determine R. Based on R, either step 5A or step 5B is performed. In this example, if R>−1, then step 5A is performed, otherwise step 5B is performed.

In step 5A, RL agent 126 updates the state variables for the selected action. For example, if action a_i was the selected action, the RL agent sets AR(a_i)=AR(a_i)+R; and sets N(a_i)=N(a_i)+1. Additionally, t is incremented (e.g., t=t+1). After the state variables are updated, the process goes back to step 1 and then continues onward from there.

In step 5B, RL agent 126 selects one or more UEs to handover to one or more other access points. We will assume in this example that RL agent 126 decided to handover to access point 106 at least UE 102. Accordingly, RL agent 126 transmits to access point 106 a handover message identifying the UEs that are being handed over to access point 106. For example, the message can contain the IMSI (or other UE identifier) for each UE being handed over. After completing the handovers, the process goes back to Step 0 and then continues onward from there.

FIG. 3 is a flowchart illustrating a reinforcement learning (RL) process 300, according to an embodiment, for traffic load management. Process 300 may begin in step s302.

Step s302 comprises, for each action included in a group of actions, storing an accumulated reward value associated with the action, thereby storing a set of accumulated reward values where each accumulated reward value include in the set is associated with a different one of the actions. In one embodiment, the group of actions (a.k.a., action space) comprises a first action, a second action, and a third action.

Step s304 comprises, for each action included in the group of actions, calculating a first action value for the action using the stored accumulated reward value for the action as one input to the calculation.

Step s306 comprises selecting, based on the calculated action values, an action from the group of actions.

Step s308 comprises performing the selected action.

Step s310 comprises, after performing the selected action, determining an UL throughput status value for a radio unit and determining a DL throughput status value for the radio unit, wherein the radio unit has an UL throughput capacity (i.e., a set maximum UL throughput) and a DL throughput capacity (i.e., a set maximum DL throughput). In one embodiment, the first action comprises increasing the UL and/or DL throughput capacity, the second action comprises decreasing the UL and/or DL throughput capacity, and the third action comprises maintaining the current UL and DL throughput capacity. Step s312 comprises determining a reward value based on the determined UL and DL throughput status values. Step s314 comprises updating the stored accumulated reward value for the selected action based on the determined reward value.

In some embodiments, the determined UL throughput status value indicates either a) that the UL throughput capacity is underused or b) that the UL throughput capacity is overused, and the determined DL throughput status value indicates either a) that the DL throughput capacity is underused or b) that the DL throughput capacity is overused. In such an embodiment, determining the reward value based on the determined UL and DL throughput status values comprises: a) determining whether the UL throughput status value indicates that the UL throughput capacity is overused, b) determining whether the DL throughput status value indicates that the DL throughput capacity is overused.

In some embodiments, as a result of determining that a) the UL throughput status value indicates that the UL throughput capacity is overused and b) the DL throughput status value indicates that the DL throughput capacity is overused, the reward value is set equal to a predetermined value X (e.g., X=−1).

In some embodiments, as a result of determining that a) the UL throughput status value indicates that the UL throughput capacity is underused and b) the DL throughput status value indicates that the DL throughput capacity is underused, the reward value is set equal to a predetermined value Y (e.g., Y=1).

In some embodiments, as a result of either: i) determining that the UL throughput status value indicates that the UL throughput capacity is underused and the DL throughput status value indicates that the DL throughput capacity is overused or ii) determining that the UL throughput status value indicates that the UL throughput capacity is overused and the DL throughput status value indicates that the DL throughput capacity is underused, setting the reward value (R) equal to: $1-((UL\_T+DL\_T)/(MAX\_UL\_T+MAXDL\_T))$, where UL_T is a measured UL throughput value, DL_T is a measured DL throughput value, MAX_UL_T is a value specifying the radio unit's UL throughput capacity, and MAX_DL_T is a value specifying the radio unit's DL throughput capacity.

In some embodiments, determining the UL throughput status value comprises: calculating a plurality of UL throughput values (e.g., a plurality of average UL through-put values); and determining the number of said UL through-put values that are greater than or equal to a first threshold throughput value T1 (e.g., T1=MAX_UL_T). In some embodiments, determining the UL throughput status value further comprises setting the UL throughput status value to a value that indicates that the UL throughput capacity is overused as a result of determining that the number of said UL throughput values that are greater than or equal to the first threshold is greater than a third threshold (e.g., 90%).

In some embodiments, determining the DL throughput status value comprises: calculating a plurality of DL throughput values (e.g., a plurality of average DL through-put values); and determining the number of said DL through-put values that are greater than or equal to a second threshold throughput value T2 (e.g., T2=MAX_DL_T). In some embodiments, determining the DL throughput status value further comprises setting the DL throughput status value to a value that indicates that the DL throughput capacity is overused as a result of determining that the number of said DL throughput values that are greater than or equal to the second threshold is greater than a third threshold (e.g., 90%).

In some embodiments, the radio unit is a component of a first access point, and process 300 further comprises initi-ating the handover of a UE (e.g., UE 102) from the first access point to a second access point if the determined reward value is equal to a predetermined value (e.g., −1). In some embodiments, the first access point is a macro base station (e.g., base station 104), and the second access point is a macro base station or a micro base station (e.g., base station 106).

Figure 4:
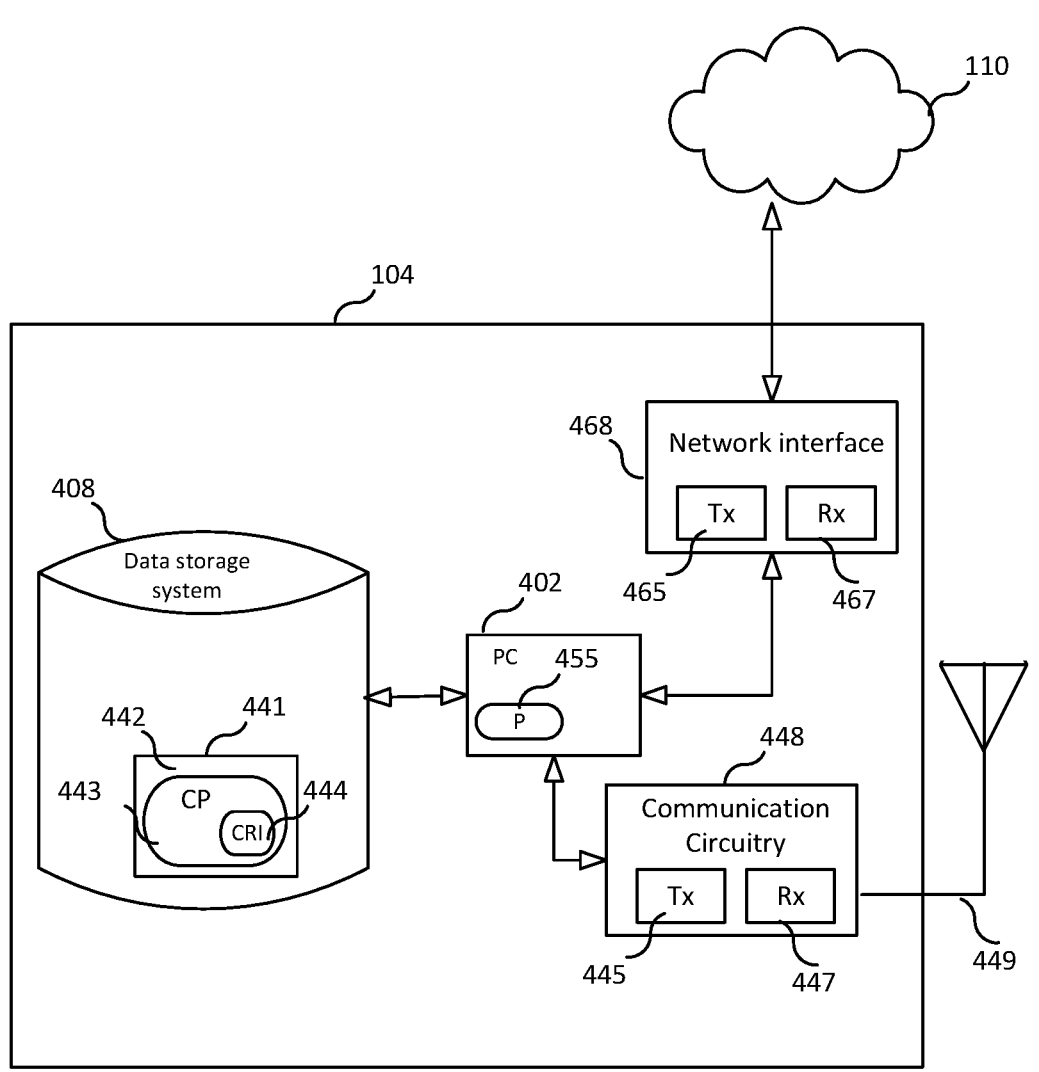
FIG. 4 illustrates an access point according to some embodiments.

FIG. 4 is a block diagram of an access point (e.g., access point 104), according to some embodiments. As shown in FIG. 4, access point 104 may comprise: processing circuitry (PC) 402, which may include one or more processors (P) 455 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., access point 104 may be a distributed computing apparatus such that BBU 122 is not co-located with radio unit 124); a network interface 468 comprising a transmitter (Tx) 465 and a receiver (Rx) 467 for enabling access point 104 to transmit data to and receive data from other nodes connected to a network 110 (e.g., an Internet Protocol (IP) network) to which network interface 468 is connected; communication circuitry 448, which is coupled to an antenna arrangement 449 comprising one or more antennas and which comprises a transmitter (Tx) 445 and a receiver (Rx) 447 for enabling access point 104 to transmit data and receive data (e.g., wirelessly transmit/receive data); and a local storage unit (a.k.a., "data storage system") 408, which may include one or more non-volatile storage devices and/or one or more volatile storage devices. In embodiments where PC 402 includes a programmable processor, a computer program product (CPP) 441 may be provided. CPP 441 includes a computer readable medium (CRM) 442 storing a computer program (CP) 443 comprising computer readable instruc-tions (CRI) 444. CRM 442 may be a non-transitory com-puter readable medium, such as, magnetic media (e.g., a hard disk), optical media, memory devices (e.g., random access memory, flash memory), and the like. In some embodiments, the CRI 444 of computer program 443 is configured such that when executed by PC 402, the CRI causes access point 104 to perform steps described herein (e.g., steps described herein with reference to the flow charts). In other embodiments, access point 104 may be configured to perform steps described herein without the need for code. That is, for example, PC 402 may consist merely of one or more ASICs. Hence, the features of the embodiments described herein may be implemented in hard-ware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] R. Sutton and A. Bato, "Reinforcement Learning: An Introduction", MIT Press, 2018.
[2] W. Saad, Z. Dawy, S. Sharafeddine, "A Utility-based Algorithm for joint uplink/downlink scheduling in wire-less cellular networks", Journal of Comput. Appl. 35(1): 348-356, 2012.

ABBREVIATIONS

FDD Frequency Division Duplex
TDD Time Division Duplex
UCB Upper Confidence Bound
NN Neural Network
URLLC Ultra Reliable Low Latency Communication
UL Uplink
DL Downlink
mMTC massive Machine Type Communications

The invention claimed is:

1. A reinforcement learning (RL) method for traffic load management, the method being performed by a RL agent of a first access point and comprising:

for each action included in a group of actions, storing an accumulated reward value associated with the action, thereby storing a set of accumulated reward values where each accumulated reward value include in the set is associated with a different one of the actions;

for each action included in the group of actions, calcu-lating a first action value for the action using the stored accumulated reward value for the action as one input to the calculation;

based on the calculated action values, selecting an action from the group of actions;

performing the selected action;

after performing the selected action, determining an uplink (UL) throughput status value for a radio unit of the first access point and determining a downlink (DL) throughput status value for the radio unit, wherein the radio unit has an UL throughput capacity and a DL throughput capacity;

determining a reward value based on the determined UL and DL throughput status values;

updating the stored accumulated reward value for the selected action based on the determined reward value; and initiating the handover of a user equipment, UE, from the first access point to a second access point if the determined reward value is equal to a predetermined value;

wherein the determined UL throughput status value indicates either i) that the UL throughput capacity is underused or ii) that the UL throughput capacity is overused, and the determined DL throughput status value indicates either i) that the DL throughput capacity is underused or ii) that the DL throughput capacity is overused;

wherein determining the reward value based on the determined UL and DL throughput status values comprises:

determining whether the UL throughput status value indicates that the UL throughput capacity is overused; and determining whether the DL throughput status value indicates that the DL throughput capacity is overused;

wherein determining the reward value further comprises:

setting the reward value equal to R as a result of either: i) determining that the UL throughput status value indicates that the UL throughput capacity is underused and the DL throughput status value indicates that the DL throughput capacity is overused or ii) determining that the UL throughput status value indicates that the UL throughput capacity is overused and the DL throughput status value indicates that the DL throughput capacity is underused, where $$R=1-((UL\_T+DL\_T)/(MAX\_UL\_T+MAXDL\_T)),$$

$UL\_T$ is a measured UL throughput value, $DL\_T$ is a measured DL throughput value, $MAX\_UL\_T$ is a value specifying the radio unit's UL throughput capacity, and $MAX\_DL\_T$ is a value specifying the radio unit's DL throughput capacity.

2. The method of claim 1, wherein the group of actions comprises a first action, a second action, and a third action.

3. The method of claim 2, wherein the first action comprises increasing the UL throughput capacity, the second action comprises decreasing the UL throughput capacity, and the third action comprises maintaining the current UL throughput capacity.

4. The method of claim 2, wherein the first action comprises increasing the DL throughput capacity, the second action comprises decreasing the DL throughput capacity, and the third action comprises maintaining the current DL throughput capacity.

5. The method of claim 1, wherein determining the reward value further comprises: setting the reward value equal to X as a result of determining that i) the UL throughput status value indicates that the UL throughput capacity is overused and ii) the DL throughput status value indicates that the DL throughput capacity is overused, where X is a predetermined number.

6. The method of claim 1, wherein determining the reward value further comprises: setting the reward value equal to Y as a result of determining that: i) the UL throughput status value indicates that the UL throughput capacity is underused and ii) the DL throughput status value indicates that the DL throughput capacity is underused, where Y is a predetermined number.

7. The method of claim 1, wherein determining the UL throughput status value comprises: calculating a plurality of UL throughput values; and determining the number of said UL throughput values that are greater than or equal to a first threshold throughput value T1.

8. The method of claim 7, wherein determining the UL throughput status value further comprises setting the UL throughput status value to a value that indicates that the UL throughput capacity is overused as a result of determining that the number of said UL throughput values that are greater than or equal to the first threshold is greater than a third threshold.

9. The method of claim 1, wherein determining the DL throughput status value comprises:

calculating a plurality of DL throughput values; and determining the number of said DL throughput values that are greater than or equal to a second threshold throughput value T2.

10. The method of claim 7, wherein determining the DL throughput status value further comprises setting the DL throughput status value to a value that indicates that the DL throughput capacity is overused as a result of determining that the number of said DL throughput values that are greater than or equal to the second threshold is greater than a third threshold.

11. The method of claim 1, wherein the first access point is a macro base station, and the second access point is a macro base station or a micro base station.

12. A non-transitory computer readable storage medium storing a computer program comprising instructions which when executed by processing circuitry of an access point causes the access point to perform the method of claim 1.

13. An access point, the access point comprising:

processing circuitry; and a memory, the memory containing instructions executable by the processing circuitry, wherein the access point is configured to perform a process comprising:

for each action included in a group of actions, storing an accumulated reward value associated with the action, thereby storing a set of accumulated reward values where each accumulated reward value include in the set is associated with a different one of the actions;

for each action included in the group of actions, calculating a first action value for the action using the stored accumulated reward value for the action as one input to the calculation;

based on the calculated action values, selecting an action from the group of actions;

performing the selected action;

after performing the selected action, determining an uplink (UL) throughput status value for a radio unit of the first access point and determining a downlink (DL) throughput status value for the radio unit, wherein the radio unit has an UL throughput capacity and a DL throughput capacity;

determining a reward value based on the determined UL and DL throughput status values;

updating the stored accumulated reward value for the selected action based on the determined reward value; and initiating the handover of a user equipment, UE, from the first access point to a second access point if the determined reward value is equal to a predetermined value;

wherein the determined UL throughput status value indicates either i) that the UL throughput capacity is underused or ii) that the UL throughput capacity is overused, and the determined DL throughput status value indicates either i) that the DL throughput capacity is underused or ii) that the DL throughput capacity is overused;

wherein determining the reward value based on the determined UL and DL throughput status values comprises:

determining whether the UL throughput status value indicates that the UL throughput capacity is overused; and determining whether the DL throughput status value indicates that the DL throughput capacity is overused;

wherein determining the reward value further comprises:

setting the reward value equal to R as a result of either: i) determining that the UL throughput status value indicates that the UL throughput capacity is underused and the DL throughput status value indicates that the DL throughput capacity is overused or ii) determining that the UL throughput status value indicates that the UL throughput capacity is overused and the DL throughput status value indicates that the DL throughput capacity is underused, where $$R=1-((UL\_T+DL\_T)/(MAX\_UL\_T+MAXDL\_T)),$$

UL_T is a measured UL throughput value,

DL_T is a measured DL throughput value,

MAX_UL_T is a value specifying the radio unit's UL throughput capacity, and

MAX_DL_T is a value specifying the radio unit's DL throughput capacity.

14. The access point of claim 13, wherein the group of actions comprises a first action, a second action, and a third action.

15. The access point of claim 14, wherein the first action comprises increasing the UL throughput capacity, the second action comprises decreasing the UL throughput capacity, and the third action comprises maintaining the current UL throughput capacity.

16. The access point of claim 14, wherein the first action comprises increasing the DL throughput capacity, the second action comprises decreasing the DL throughput capacity, and the third action comprises maintaining the current DL throughput capacity.

* * * * *